Figure 5:
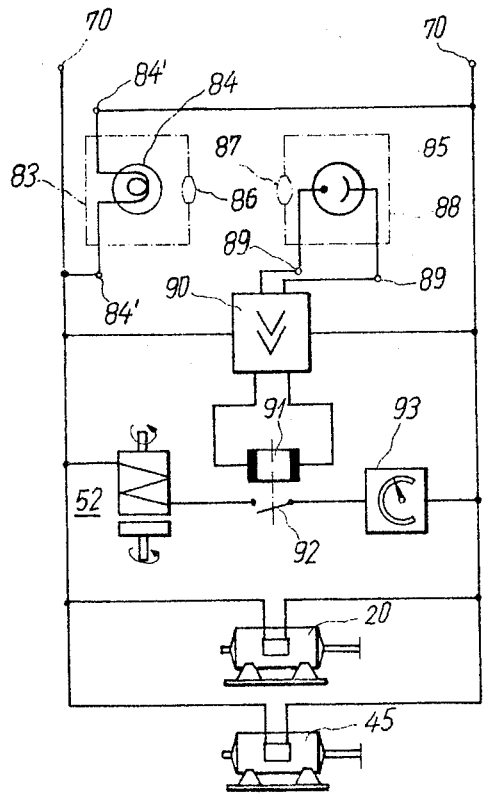

Aug. 2, 1966  R. VASSALLI  3,263,543
STRIPPING AND CUTTING UNIT FOR ALIMENTARY PASTE PRODUCTS
Filed Aug. 5, 1963  4 Sheets-Sheet 1
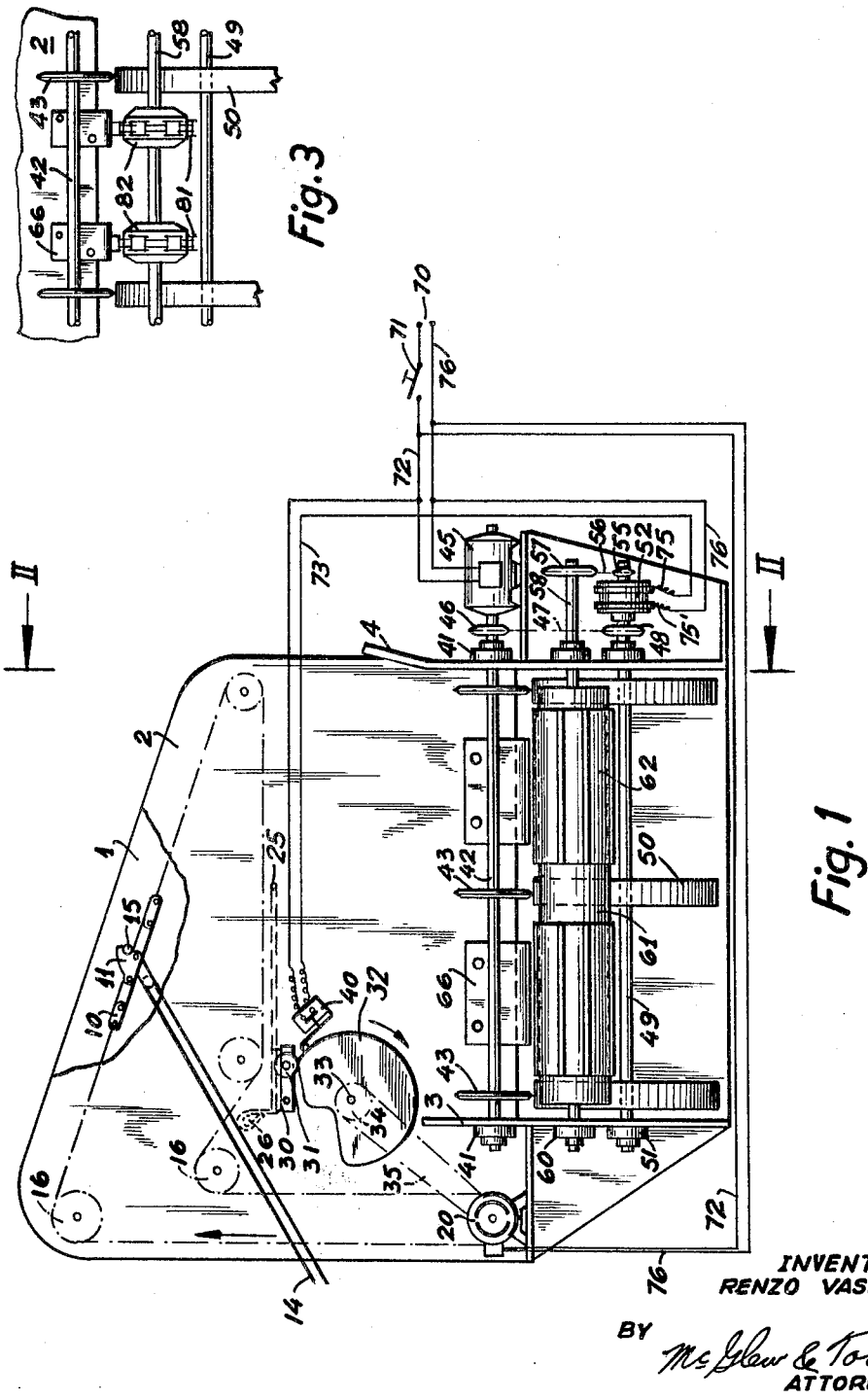
INVENTOR.
RENZO VASSALLI
BY
*McGlew & Toren*
ATTORNEYS

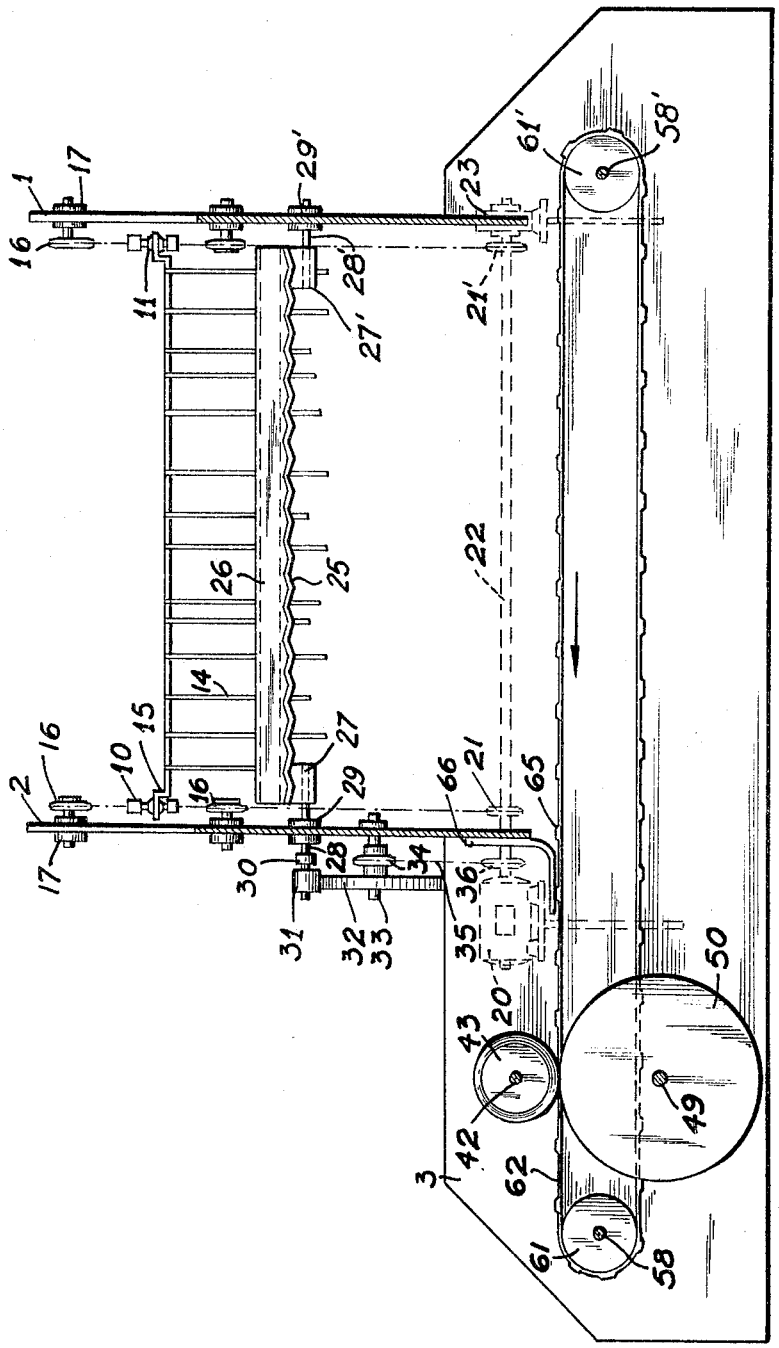

INVENTOR.
RENZO VASSALLI
BY McGlew & Toren
ATTORNEYS.

United States Patent Office 3,263,543
Patented August 2, 1966

3,263,543
STRIPPING AND CUTTING UNIT FOR
ALIMENTARY PASTE PRODUCTS
Renzo Vassalli, Uzwil, Switzerland, assignor to Gebruder
Buhler, Uzwil, Switzerland, a company of Switzerland
Filed Aug. 5, 1963, Ser. No. 299,965
Claims priority, application Switzerland, Aug. 10, 1962,
9,611/62
13 Claims. (Cl. 83—367)

This invention relates to machines for automatic production of stranded alimentary paste products, such as spaghetti, noodles, macaroni and the like. More particularly the invention applies to an automatic stripping and cutting unit for extruded strands of alimentary paste suspended on moving suspension rods, comprising a first continuously operating conveyer means to supply laden suspension rods, stripping means to remove said stranded material from said suspension rods, and a second continuously operating conveyer transversely disposed in respect of said first conveyer means to deliver the strands to the cutting means.

Apart from stripping and cutting stations designed for manual alignment of the goods to be cut against alignment means, or stations having cutting knives moving along the suspension rods to cut the strands, or otherwise, automatic devices having alignment means for the depending free ends of the legs of the depending strands to determine the length of the finished product, it had been further proposed to provide alignment means for the U-shaped suspension loops of the strands to determine the length of the finished products. In all these arrangements the U-shaped strands are usually deposited on conveyer belts or the like substantially flat supporting means and pushed against fixed stop members by means of eccentric shafts or cams. These means have, for the first time, enabled automatic stripping and cutting stranded alimentary paste products with a minimum of waste, to uniform length and ready for packaging, whereby at the one end the suspension loops and at the other the unequal leg ends only had to be cut and trimmed.

Occasionally however suspension loops happen to break or come to lie one upon another on account of too wide opening of the U-shaped strand legs, thus rendering uniform displacement along, and separation of the strands from, the rods problematic.

The main object of this invention therefore consists in eliminating the above mentioned inconveniences. To achieve these results the characteristic features of the stripping and cutting unit claimed include a tilting table disposed in close proximity of the first conveyer means, said tilting table having a stripping member fixed along one edge thereof to remove the suspended material from suspension rods and the second conveyer means arranged below the tilting table having an aligning member disposed along the suspension loop end side of the material deposited on the second conveyer.

Figure 4:
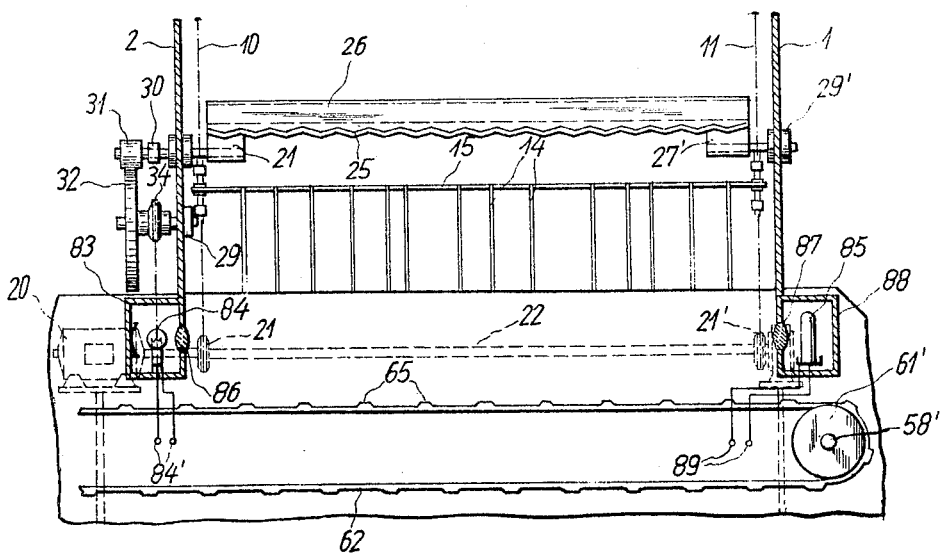
Figure 6:
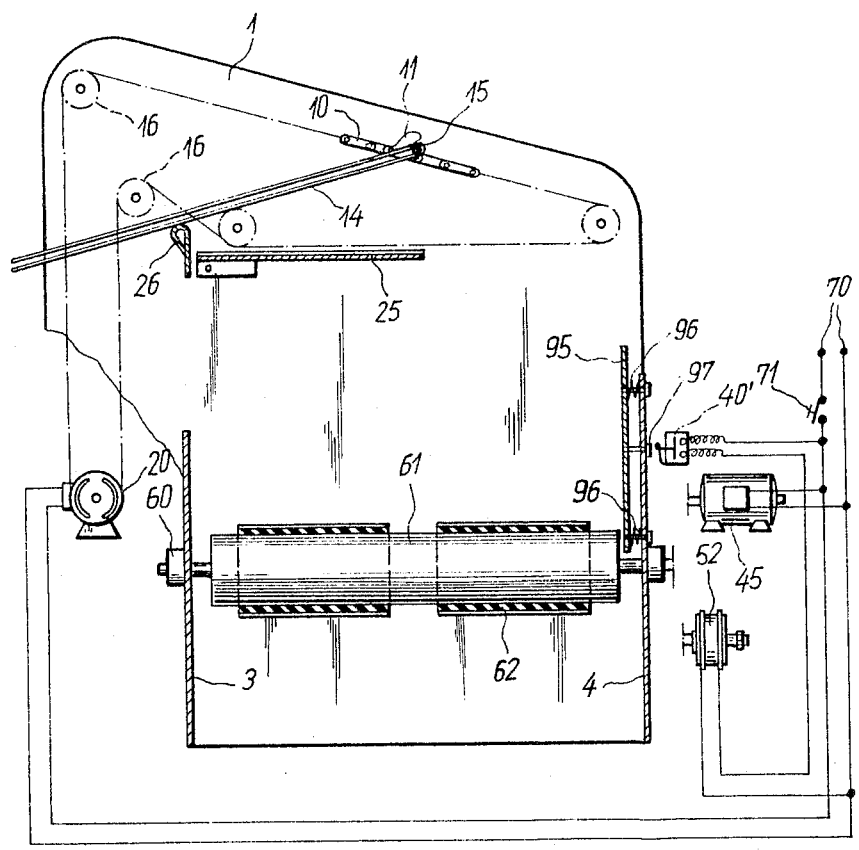

Other objects and advantages as well as further characteristic features of this invention will become apparent from the following detailed description of two preferred embodiments and the appended drawing, showing in FIG. 1 a front elevation of a first embodiment of the stripping and cutting unit according to this invention as seen from the cutting station side, FIG. 2 a sectional view of the unit along the line II—II of FIG. 1, FIG. 3 a detail representation of a second embodiment of the second conveyer, as seen from the cutting station side, FIG. 4 a view similar to FIG. 2 illustrating a photoelectric control for the apparatus;

FIG. 5 a schematic wiring diagram corresponding to FIG. 4; and,

FIG. 6 a vertical sectional view, generally similar to FIG. 1, but illustrating an alternative control for the apparatus.

Referring now to FIGURES 1 and 2 of the drawing, wherein the arrows indicate the sense of rotation or motion, four main walls 1, 2, 3 and 4 form the housing of the stripping and cutting unit of this invention. The stripping device is accommodated mainly within walls 1 and 2, while the cutting station is accommodated within the walls 3 and 4. A feeding conveyer, comprising a pair of conveyer chains 10 provided with spaced engaging members 11, transfers the extruded alimentary paste strands 14 suspended on appropriate suspension rods 15 onto the stripping and cutting unit. The conveyer chains 10 are guided by sprocket wheels 16 journalled in bearings 17 and driven by a motor 20 by means of sprockets 21 and 21' disposed on a driving shaft 22, journalled in a bearing 23. A tilting table 25, having a longitudinally ribbed upper surface, is provided with a first stop or aligning member 26 arranged along one edge, and two fixing members 27 and 27' for two pivot pin 28 and 28' disposed at each end of said edge which might be termed tilting edge. The pivot pins 28 and 28' are journalled in bearings 29 and 29' respectively. The pivot pin 28 passing through the bearing 29 carries at its end outside the wall 2 a lever 30 with an idler or follower roll 31 at its free end. The idler or follower roll 31 cooperates with a cam disk 32 journalled, together with a sprocket wheel 34, on bearing 33. Sprocket wheel 34 is connected with sprocket wheel 36 by means of a chain 35, and sprocket wheel 36 is fixed on the driving shaft 22. The cam disk 32 further actuates an electric pilot switch 40.

In the walls 3 and 4 of the cutting or trimming station are disposed bearings 41 for a shaft 42 carrying cutter disks 43. Shaft 42 is driven by a motor 45 and also carries a sprocket wheel 46 rotatably linked with a shaft 49 by means of a chain 47 and a sprocket 48. On the shaft 49, there are disposed counter rolls 50 cooperating with the cutter disks 43. The shaft 49 is journalled in bearings 51 also fixed in the walls 3 and 4. A coupling 52 disposed outside the chain wheel 48 on shaft 49 couples this latter with a sprocket 55 which, in turn, is rotatably linked by means of a chain 56 with a sprocket 57 on a shaft 58, which is journalled in bearings 60 also disposed in the walls 3 and 4 and drives a rotatable belt drum 61. A ribbed belt 62 runs over the drum 61 and a further drum 61', disposed on a shaft 58' at the opposite end of, and journalled in, the walls 3 and 4. The belt 62 is provided with a multitude of ribs 65. A guide member 66 consisting of a suitable resilient material is fixed against wall 2 above and across the belt 62.

The driving motors as well as a coupling control circuit are energized from main terminals 70, upon corresponding operation of a main switch 71, through conductors 72 to 76 inclusive. The coupling control circuit includes the conductor 72, electric control switch 40, conductors 73 and 76, a first contact brush 75 and a second contact brush 75' to energize a magnetic coupling 52 of the belt drive. Both motors 20 and 45 driving the supply and stripping mechanisms and the cutting or trimming mechanism respectively are branched directly on conductors 72 and 76.

The arrangement described works as follows:

Motors 20 and 45 are energized upon closing main switch 71 and drive the supply conveyer chains 10, the driving chain 35 of the cam disk 32 and the driving chain 47 linking the shaft 42 of the cutter disks 43 with the shaft 49 carrying the counter rolls 50. The belts 62, however, running over the rotatable belt drums 61, 61' are driven only intermittently by the driving chain 56 when, and as long as, the control switch 40 actuated by the cam disk 32 is closed to energize and thereby engage the magnetic coupling 52.

Rods 15, pendantly supporting extruded strands 14 of spaghetti or other suitable alimentary paste products, are manually or automatically delivered and positioned in the spaced engaging members or chain sprockets 11 of the rising branch of the feeding chain conveyer 10 between driving motor 20 and the uppermost or top set of the sprocket wheels 16. While running over sprocket wheels 16, the feeding or supply conveyer chains 10 deflect from a substantially vertical to a slanting or inclined course towards a lower set of sprocket wheels 16 deflecting the chains to a horizontal return course above the tilting table 25, whereby the strands abut against aligning member 26 of the tilting table 25 whereon they are subsequently deposited in parallel relation by virtue of the ribbed table surfaces. While the suspension rods 15 move further leftwards as viewed in FIGURE 1 the strands 14 are separated from the rods 15. This separation takes place immediately after the rods 15 have passed a further set of deflecting sprocket wheels 16 altering thereby the direction of the chain conveyer course from a horizontal to a slightly ascending one to pass above aligning member 26.

After the strands 14 are deposited on the tilting table 25 with their open ends abutting against aligning member 26 the tilting table 25 is pivoted downwardly to such a degree that the strands 14 glide down on the surface of table 25 under the influence of their own weight for alignment by abutting with their looped ends against housing wall 4. By a subsequent further tilting motion of the table 25 into vertical position, the strands 14 are released to drop onto the conveyer belts 62, which are provided with transversely disposed ribs 65 promoting the transverse arrangement thereon in cooperation with elastic guide members 66 for which, very conveniently, e.g. a leather strip or the like may be used. By closing main switch 71, motor 45 driving the trimming or cutter disks 43 together with their counter rolls 50 starts rotating continuously, whereas the conveyer belts 62 are put into operation by the magnetic coupling 52, the pinions 55 and 57, and the chain 56. Energization or excitation of the magnetic coupling means 52 takes place by means of the control switch 40 actuated by the cam disk 32.

The control of the whole system takes place as follows:

In the closed position of the main switch 71 the motors 45 and 20 are in continuous operation and, suspension rods 15 having alimentary paste strands 14 depending therefrom are supplied continuously into the stripping mechanism. The cam disk 32 rotates concurrently with motor 20. The idler or follower roll 31 follows the contour or outline of the cam disk 32 and imparts its movement to the tilting table 25. As may be seen from FIGURE 1 the contour of the cam disk 32 is designed to effect two sequential tilting degrees of the tilting table 25 during each complete revolution, the first occurring at a relatively slow speed into a sloping position, while the second consists of a relatively rapid movement into the vertical. The circular periphery of the cam disk 32 defines the phase of the maximum distance between the axes of the follower or idler roll 31 and the cam disk 32, which also corresponds to the horizontal position of the tilting table 25 and simultaneously to the closed position of the control switch 40, thereby energizing the magnetic coupling 52 and initiating operation of the conveyer belts 62. During the tilting phase, until completion of the return movement of table 25, control switch 40 remains open, the magnetic coupling 52 de-energized and the conveyer belts in position of rest.

The alimentary paste strands 14, deposited on the conveyer belts 62 with their looped ends abutting against housing wall 4 between the transversely disposed ribs 65 of the belts, are subsequently transferred below the resilient guide members 66 to the cutting or trimming station, which may be of any suitable conventional design. The one shown in the drawing, for example, includes a set of cutting disks 43 cooperating with a corresponding set of oppositely disposed counter rolls 50 having a cylindrical outer surface which have proved very convenient for dustfree cutting and trimming, of long and thin type stranded alimentary paste material, to very uniform packaging size.

A significant advantage of the new concept described consists in that it enables the supply of new material while the retransfer and subsequent cutting and trimming operations are going on. In contrast to hitherto known equipment, the new unit therefore performs the two main operations under consideration simultaneously, viz, stripping the strands 14 from their suspension rods 15 and severing the material uniformly to the predetermined packaging length. In hitherto known equipment, these operations had to be performed successively. In other known equipment, the strands had to be pushed towards an aligning or stop member separately which, in the new unit now takes place automatically while the strands 14 pass from the tilting table 25 to the ribbed conveyer belts 62.

In another embodiment of this invention shown in FIGURE 3, conveyer chains 81 suitably disposed in parallel relation on sprocket wheels 82 and shafts 58 may be used instead of the conveyer belts 62. By this arrangement a further advantage is achieved in that broken and otherwise too short strands deposited onto conveyer chains 81 drop down between them and are thus automatically rejected and separated from the goods that will be packed. This advantage becomes particularly evident in the event transparent materials are used for packaging.

In the embodiments disclosed by the foregoing description with reference to the appended drawing various functional elements may be substituted without departing from the spirit of this invention, as may be illustrated by the following examples. Instead of the control means disclosed for the belt conveyer control, i.e. the magnetic coupling 52, other control means, for example suitable photo-electric control means or the like, which may be actuated by the strands 14 deposited on the retransmission conveyer, may be used instead of the control switch 40 actuated by the cam disk 32 in correlation with the position of the tilting table 25. Such an arrangement is shown in FIGS. 4 and 5.

Referring to these figures, a housing 83 is mounted on wall 2 and contains a lamp 84, such as an incandescent lamp, whose light is directed through a lens 86 along and above the conveyer 62. Light from lamp 84 is focused through a lens 87 onto a photo cell 85 in a housing 88 mounted on wall 1. The terminals 84' of lamp 84 are connected across the conductors connected to input terminal 70, so that lamp 84 is energized whenever terminals 70 have a potential thereacross.

The output terminals 89 of photo cell 85 are connected to an amplifier 90 which amplifies the output of photo cell 85 to control a relay having a coil 91 operating a contact 92. Contact 92 is connected across the terminals 70 is a series circuit with the electromagnetic clutch 52 and a timer 93.

As the light beam between lenses 86 and 87 is interrupted by the strands 14, the resultant change in the light falling on photo cell 85 effects operation of the relay coil 91 to control contact 92 to close the energizing circuit for electromagnetic clutch 52.

Another form of control means for the apparatus is shown in FIG. 6. Referring to this figure, a vertically oriented plate 95 is mounted on wall 4 and biased outwardly by springs 96. Plate 95 has secured thereto an operator 97 cooperable with a switch 40' corresponding to the switch 40 of FIG. 1. In the arrangement of FIG.

6, as the strands 14 are discharged due to tilting of table 25, the strands strike the plate 95 and move the same outwardly, whereby operator 97 will actuate 40', in the same manner as described for FIG. 1, to control the electromagnetic clutch 52. It will be noted that switch 40' is connected in a series circuit between switch 71 and electromagnetic clutch 52.

It is further possible to use some moving belt system, e.g. as already known from prior art, as guide means for the goods on their way to the cutting stations 42, 43, 49, 50, instead of the resilient strips 66 shown in the drawing. From prior art it is further known to use individual driving means for the supply or feeding and the cutting system respectively. The stripping and cutting unit of this invention can moreover be operated in conjunction with an alimentary paste drying plant by some common driving means. According to another proposal already known dried extruded alimentary paste goods are transferred from the drying plant into some storage means for retransmission to the stripping and cutting equipment at suitable intervals at a higher speed than the discharge rate of the drying plant.

Further characteristic features of the stripping and cutting unit, several embodiments of which have been disclosed hereinbefore, consist in providing new and novel means to considerably increase the production capacity of such equipment and to ensure improved working conditions. These results are achieved by the alignment of the suspension loops instead of the free leg ends of the strands along suitable aligning or guide members which also define the plane or line of reference for further handling, viz, cutting and trimming to packaging size.

What is claimed is:

1. In an automatic stripping and cutting unit for handling elongated strands of food and the like products, looped over suspension rods, and of the type including a first endless conveyer means for receiving and transporting strand-laden suspension rods, stripping means for removing the looped strands from the suspension rods, strand cutting and trimming means, and a second endless conveyer extending transversely of the first conveyer means for delivering looped strands, stripped from the suspension rods, to the cutting and trimming means: the improvement comprising stripping means including a table disposed beneath said first conveyer means, means pivotally supporting said table at one end for tilting of its free end about an axis extending transversely of said first conveyer means, and a stripping member extending along said one end of said table; said first conveyer means having an upper run extending toward the free end of said table and a lower run extending, immediately above said table, toward said one end of said table; said stripping member engaging the legs of looped strands suspended on said suspension rods traveling along said upper run to swing the suspended strands to pivot about their loop ends toward said table, and abutting the free ends of the strand legs as the suspension rods travel along said lower run to strip the strands from said suspension rods; said second conveyer being disposed beneath said table; and an aligning member extending along one side of said second conveyer in spaced relation to the free end of said table; said table being tiltable downwardly to discharge strands thereon onto said second conveyer with their loop ends engaged with said aligning member.

2. An automatic stripping and cutting unit as claimed in claim 1, wherein said upper run slopes downwardly toward the free end of said table.

3. An automatic stripping and cutting unit, as claimed in claim 1, wherein said lower run includes a portion adjacent said stripping member sloping upwardly above said stripping member.

4. Automatic stripping and cutting unit, according to claim 1, wherein said table 25 is provided with a longitudinally ribbed upper surface.

5. Automatic stripping and cutting unit as claimed in claim 1, comprising means for tilting said table 25 between a horizontal position, a sloping position and a substantially vertical position.

6. Automatic stripping and cutting unit, as claimed in claim 5, wherein the means for tilting said table 25 include a cam disk 32.

7. Automatic stripping and cutting unit, as claimed in claim 1, wherein the second conveyer includes at least one conveyer belt 62 provided with transversely extending longitudinally spaced ribs 65.

8. Automatic stripping and cutting unit, as claimed in claim 1, wherein the second conveyer includes at least two conveyer chains disposed in parallel spaced relation.

9. Automatic stripping and cutting unit, as claimed in claim 1, wherein the second conveyer immediately precedes said cutting and trimming means in the order of successive operations.

10. Automatic cutting and stripping unit, as claimed in claim 6, comprising means for continuously operating the first conveyor means 10, and control means intermittently operating the second conveyer responsive to tilting of said table.

11. Automatic stripping and cutting unit, as claimed in claim 10, wherein the control means for intermittent operation of the second conveyer include said cam disk 32.

12. Automatic stripping and cutting unit, as claimed in claim 10, wherein said control means are actuated by the goods in process to control the operation of the second conveyer.

13. Automatic stripping and cutting unit, as claimed in claim 11, wherein said control means are actuated by the goods in process, and include photo-electric means.

References Cited by the Examiner

UNITED STATES PATENTS

| | | | |
|---|---|---|---|
| 2,649,055 | 8/1953 | Borrelli | 83—926 |
| 2,649,056 | 8/1953 | Autenrieth | 83—926 |
| 2,652,143 | 9/1953 | Van Doren | 198—182 |
| 2,784,835 | 3/1957 | Dixon | 198—198 |
| 2,813,498 | 11/1957 | Senzani | 83—926 |
| 2,917,959 | 12/1959 | Senzani | 83—417 |
| 2,939,354 | 6/1960 | King | 83—365 |
| 2,958,243 | 11/1960 | Foster | 83—365 |
| 3,126,848 | 3/1964 | Gastonguay | 83—80 |

ANDREW R. JUHASZ, *Primary Examiner.*

J. B. McGUIRE, *Assistant Examiner.*